United States Patent Office 2,928,838
Patented Mar. 15, 1960

2,928,838

2-ALKYL SPIRO (4.4) NONANO (1,2d) THIAZOLE, QUATERNARIES AND PROCESS

George de Stevens, New Providence, N.J., assignor to Sperry Rand Corporation, New York, N.Y., a corporation of Delaware No Drawing. Original application June 27, 1956, Serial No. 594,120. Divided and this application November 5, 1958, Serial No. 773,539

9 Claims. (Cl. 260—302)

This invention relates to a new composition of matter. More particularly it relates to 2-alkyl spiro (4.4) nonano (1,2d) thiazole and a process for preparing same.

This application is a division of the co-pending application of George de Stevens, Serial Number 594,120, filed June 27, 1956, for Sensitizing Dyes Containing the Spiro (4.4) Nonano (1,2d) Thiazole Nucleus.

It has been found that the new thiazole compound of this invention has many useful properties. For example, it is possible to prepare cyanine dyes therefrom which are capable of sensitizing photographic emulsions strongly and cleanly, i.e., without the production of excessive fog or residual dye stain.

It is known that cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain. With the thiazole compound of this invention, it is possible to prepare cyanine dyes in which one or both of the aforesaid auxochromic nitrogen atoms lie in a spiro (4.4) nonano (1,2d) thiazole nucleus.

Accordingly, it is the primary object of the present invention to provide the new thiazole compound 2-alkyl-spiro (4.4) nonano (1,2d) thiazole having the formula

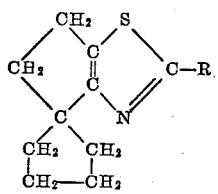

wherein R represents an alkyl radical $C_NH_{2N+1}$ and N is a positive integer of from one to three.

For a better understanding of the invention, together with other and further objects thereof, reference is had to the following description and its scope will be pointed out in the appended claims.

Generally speaking, the thiazole of this invention may be prepared by brominating spiro (4.4) nonan-1-one (Felinskii Comp. rend. acad. Sci. USSR 49, 568 (1945); C.A. 40, 6058 (1946)) at position 2 to yield 2-bromo spiro (4.4) nonan-1-one, and then reacting the enol form of 2-bromo spiro (4.4) nonan-1-one with thioacetamide to yield 2-methyl spiro (4.4) nonano (1,2d) thiazole as follows:

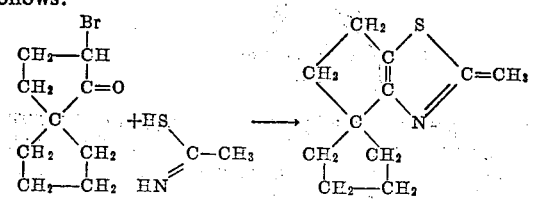

The following examples will serve to demonstrate the manner of preparation of the new thiazole of this invention and quaternary salts thereof. These examples are not intended, however, to limit the invention.

*Example I.*—*2-bromo spiro (4.4) nonan-1-one*

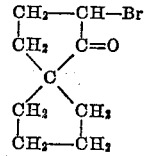

A solution of 27.0 g. (0.15 mole) of bromine in 50 ml. of glacial acetic acid was added dropwise with stirring to a chilled (7°–10° C.) solution of 21.0 g. (0.15 mole) of spiro (4.4)-nonan-1-one in 60 ml. of glacial acetic acid. Pentane (300 ml.) was added and the pentane solution was washed twice with water and twice with sodium bicarbonate solution and dried over $K_2CO_3$. The volume of the pentane solution was reduced to 150 ml. which, after chilling at −50° C., deposited a fine white precipitate. The product was collected at the pump, washed with chilled (−50° C.) pentane and dried over $CaCl_2$. The yield of 2-bromo ketone melting at 39°–40° was 92% of theoretical.

*Example II.*—*2-methylspiro (4.4) nonano (1,2d) thiazole*

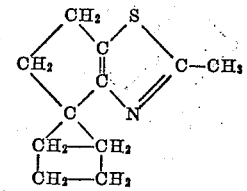

A mixture of 21.8 g. (0.1 mole) of 2-bromo spiro (4.4) nonan-1-one and 7.5 g. (0.1 mole) of thioacetamide was heated slowly up to 70° whereupon a vigorous reaction followed which was controlled by external cooling. The temperature of the reaction mixture did not rise above 127° and was maintained at 100° for 10 minutes. The brown viscous mass was chilled and extracted with 20% aqueous hydrobromic acid solution. The acid extract, after thorough ether extraction, was made basic with $NH_4OH$ and extracted with ether. The ether extract was then dried over $K_2CO_3$. After evaporation of the ether, the residue was distilled at reduced pressure giving rise to 22% yield of 2-methylspiro (4.4) nonano (1,2d) thiazole, B.P. 90°–95°/0.5 mm.

*Example III.*—*2-methylspiro (4.4)nonano (1,2d) thiazole methiodide*

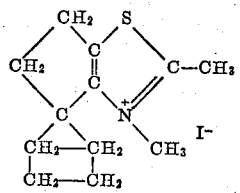

A mixture of 0.5 g. (1 mol.) of 2-methylspiro (4.4) nonano (1,2d) thiazole, 1.0 g. (1 mol.+200% excess) of methyl iodide was refluxed for 24 hours. The chilled solution was triturated three times with 50 ml. portions of ether. The viscous residue was triturated with 3 ml. of acetone and chilled for several hours, whereupon the light yellow powder was collected on a filter, washed with 2 ml. of cold acetone and air dried. The yield of crude product melting at 208°–210° was 40% of theoretical. Recrystallization from acetone (200 ml. per gram) gave pure quaternary salt melting at 220°–222° with decomposition.

*Analysis.*—Calcd. for $C_{12}H_{18}NSI$: N, 4.18%; S, 9.57%. Found: N, 4.06%; S, 9.70%.

*Example IV.—2-methylspiro (4.4) nonano (1,2d) thiazole ethiodide*

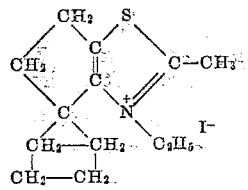

A mixture of 4.0 g. (1 mol.) 2-methylspiro (4.4) nonano (1,2d) thiazole and 7.0 g. (1 mol.+200% excess) of ethyl iodide was refluxed for 18 hours. The chilled solution was triturated well with ether and then cold acetone giving rise to a light yellow powder which was collected on a filter, washed with cold acetone and air dried. The yield of crude quaternary salt, M.P. 178°–180°, was 36% of theoretical.

As starting material for the preparation of novel cyanine dyes, the 2-alkyl spiro (4.4) nonano (1,2d) thiazole, particularly 2-methyl spiro (4.4) nonano (1,2d) thiazole, is first converted to a quaternary salt by reacting it with an ester such as set forth hereinabove in Examples 3 and 4. Examples of such esters are alkyl halides, alkyl sulfates, alkyl-p-toluene sulfonate, etc. For purposes of convenience, the quaternary salts useful in preparing the new cyanine dyes can be represented by the general formula

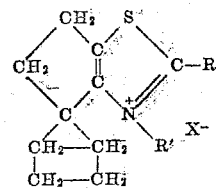

wherein R' represents an alkyl group, e.g., methyl, ethyl, n-propyl, isobutyl, n-butyl, beta-hydroxyethyl, beta-methoxyethyl, beta-ethoxyethyl, beta-acetoxyethyl, beta-carboxyethyl, carboxymethyl, beta-carbomethoxyethyl, beta-carbethoxyethyl, allyl, etc., or an aralkyl group, e.g., benzyl, phenyl, etc., R represents methyl, ethyl or n-propyl and $X^-$ represents an anion, e.g., chloride bromide, iodide, benzene sulfonate, p-toluene sulfonate, methyl sulfate, ethyl sulfate, thiocyanate, perchlorate, acetate, etc.

To prepare pseudocyanine dyes from such quaternary salts, they are reacted with 2-halogenoquinoline quaternary salts in the presence of an acid binding agent such as sodium ethylate, sodium carbonate, pyridine or a strong organic base such as triethylamine, trimethylamine, and n-methyl piperidine. In this connection, it has been found advantageous to employ a mixture of pyridine with a strong tertiary organic base.

Instead of 2-halogenoquinoline quaternary salts, there can be employed 2-alkylmercapto or 2-arylmercaptoquinoline quaternary salts to condense with the quaternary salts of the 2-alkyl spiro (4.4) nonano (1,2d) thiazole, in the presence of an acid binding agent.

Using 2-halogenopyridine quaternary salts instead of 2-halogenoquinoline quaternary salts, there can be prepared pyrido-cyanine dyes containing a spiro (4.4) nonano (1,2d) thiazole nucleus.

Using 2-alkyl or 2-aryl mercaptobenzothiazole or naphthothiazole salts, there can be prepared simple cyanine dyes other than pseudocyanine dyes.

To prepare symmetrical carbocyanine dyes from 2-alkyl spiro (4.4) nonano (1,2d) thiazole quaternary salts, the quaternary salts are reacted with esters of ortho acids, such as ethyl orthoformate, ethyl orthoacetate, ethyl orthopropionate and ethyl orthobenzoate in the presence of pyridine or a mixture of pyridine and triethylamine.

To prepare unsymmetrical carbocyanine dyes from 2-alkyl spiro (4.4) nonano (1,2d) thiazole quaternary salts, they are reacted with cycloammonium quaternary salts containing a beta-aryl aminovinyl group in the alpha or gamma position, i.e., in one of the so-called reactive positions in the presence of an acid binding agent, e.g., pyridine or pyridine plus triethylamine.

To prepare styryl dyes from the new quaternary salts of this invention, they are condensed with p-dialkyl aminobenzaldehyde in the presence of an alkaline catalyst such as piperidine in absolute ethanol solution.

To prepare merocarbocyanine dyes from 2-alkyl spiro (4.4) nonano (1,2d) thiazole quaternary salts, they are condensed with ketomethylene heterocyclic intermediates containing an aryl aminomethylene group in the 5-position in the presence of an acid binding agent, e.g., pyridine plus triethylamine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halide emulsions with the aforesaid dyes, they are dispersed in the emulsions such as the conventional gelatino-silver halide, e.g., gelatino-silver bromide, bromoiodide, chloride and chlorobromide. The methods of incorporating these dyes in emulsions are simple and well known to those skilled in the art, and described in various patents and publications. A typical method, for example, is the one described in U.S. Patent 2,336,843, patented December 14, 1943.

While there have been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. The new compound, 2-alkyl spiro (4.4) nonano (1,2d) thiazole having the general formula:

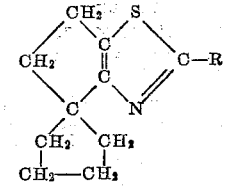

where R represents an alkyl radical $C_nH_{2n+1}$ and $n$ is a positive integer selected from the group, one to three, both inclusive.

2. The new compound 2-methylspiro (4.4) nonano (1,2d) thiazole having the structure:

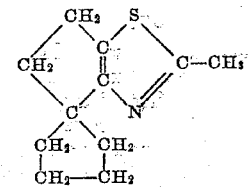

3. The new compound consisting of a quaternary salt of the compound described in claim 1 having the following general formula:

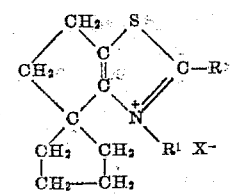

where R represents an alkyl radical $C_nH_{2n+1}$, $n$ is a positive integer selected from the group, one to three, both inclusive, and R' represents a member selected from the group consisting of alkyl and aralkyl groups, and $X^-$ represents an anion.

4. The new compound 2-methylspiro (4.4) nonano (1,2d) thiazole methiodide having the structure:

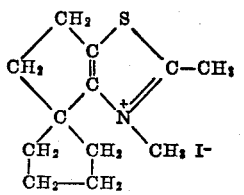

5. The new compound 2-methylspiro (4.4) nonano (1,2d) thiazole ethiodide having the structure:

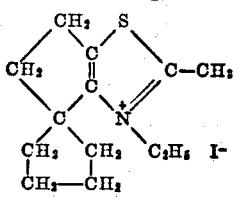

6. A process for preparing new 2-alkyl-spiro (4.4) nonano (1,2d) thiazole bases consisting of reacting 2-bromospiro (4.4) nonan-1-one with a thioamide selected from the group consisting of thioacetamide and thiopropionamide.

7. A process for preparing 2-methyl-spiro (4.4) nonano (1,2d) thiazole consisting of reacting 2-bromospiro (4.4) nonan-1-one with thioacetamide.

8. A process for preparing 2-methylspiro (4.4) nonano (1,2d) thiazole methiodide consisting of refluxing 2-methylspiro (4.4) nonano (1,2d) thiazole with methyl iodide.

9. A process for preparing 2-methylspiro (4.4) nonano (1,2d) thiazole ethiodide comprising heating 2-methylspiro (4.4) nonano (1,2d) thiazole with ethyl iodide.

References Cited in the file of this patent
UNITED STATES PATENTS 2,160,867    Hromatka _____ June 6, 1939